United States Patent
Wu

(10) Patent No.: US 10,149,344 B2
(45) Date of Patent: Dec. 4, 2018

(54) DEVICE AND METHOD OF HANDLING A RADIO RESOURCE CONTROL STATE CHANGE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/589,961

(22) Filed: May 8, 2017

(65) Prior Publication Data

US 2017/0325283 A1    Nov. 9, 2017

Related U.S. Application Data

(60) Provisional application No. 62/333,281, filed on May 9, 2016.

(51) Int. Cl.
*H04W 76/27* (2018.01)
*H04W 8/22* (2009.01)
(Continued)

(52) U.S. Cl.
CPC ............. *H04W 76/27* (2018.02); *H04W 8/22* (2013.01); *H04W 36/0094* (2013.01);
(Continued)

(58) Field of Classification Search
CPC ........... H04W 76/046; H04W 52/0216; H04W 76/048; H04W 36/0094; H04W 36/08;
(Continued)

(56) References Cited

U.S. PATENT DOCUMENTS

| 2012/0044897 A1* | 2/2012 | Wager | H04L 1/0039 370/329 |
| 2013/0201924 A1* | 8/2013 | Song | H04W 76/02 370/329 |

(Continued)

OTHER PUBLICATIONS

3GPP TS 36.331 V13.1.0 (Mar. 2016) Technical Specification 3rd Generation Partnership Project; Technical Specification Group Radio Access Network; Evolved Universal Terrestrial Radio Access (E-UTRA); Radio Resource Control (RRC); Protocol specification (Release 13), pp. 1-551.

(Continued)

*Primary Examiner* — Saumit Shah
(74) *Attorney, Agent, or Firm* — Winston Hsu

(57) ABSTRACT

A communication device for handling a radio resource control (RRC) state change comprises a storage unit for storing instructions and a processing circuit, coupled to the storage unit. The processing circuit is configured to execute the instructions stored in the storage unit. The instructions comprise receiving a RRC Connection Setup message for establishing a RRC connection between the communication device and a first base station (BS); entering a RRC_Connected state; receiving a Security Mode Command message to activate a security for a data communication between the communication device and the first BS; receiving a RRC Connection Reconfiguration message configuring at least one radio bearer (RB); transmitting a user equipment (UE) capability indicating that the communication device supports a RRC_Light_Connected state; receiving a RRC message configuring the RRC_Light_Connected state to the communication device; and entering the RRC_Light_Connected state in response to the RRC message and starting performing a cell reselection.

17 Claims, 6 Drawing Sheets

(51) Int. Cl.
*H04W 36/00* (2009.01)
*H04W 36/08* (2009.01)
*H04W 36/36* (2009.01)
*H04W 52/02* (2009.01)
*H04W 68/00* (2009.01)
*H04W 74/08* (2009.01)

(52) U.S. Cl.
CPC ........... *H04W 36/08* (2013.01); *H04W 36/36* (2013.01); *H04W 52/0216* (2013.01); *H04W 68/005* (2013.01); *H04W 74/0833* (2013.01); *Y02D 70/1262* (2018.01); *Y02D 70/142* (2018.01); *Y02D 70/21* (2018.01); *Y02D 70/24* (2018.01)

(58) Field of Classification Search
CPC ... H04W 36/36; H04W 8/22; H04W 74/0833; H04W 68/005
See application file for complete search history.

(56) References Cited

U.S. PATENT DOCUMENTS

| | | | |
|---|---|---|---|
| 2016/0105917 A1* | 4/2016 | Miao | H04W 76/046 370/329 |
| 2016/0135247 A1* | 5/2016 | Ozturk | H04W 52/0212 455/436 |
| 2016/0278041 A1* | 9/2016 | Frederiksen | H04W 68/005 |
| 2017/0251516 A1* | 8/2017 | Bangolae | H04W 76/27 |
| 2017/0289877 A1* | 10/2017 | Wu | H04W 4/005 |
| 2017/0303334 A1* | 10/2017 | Kim | H04W 76/046 |
| 2017/0311243 A1* | 10/2017 | Rinne | H04W 48/14 |
| 2017/0311278 A1* | 10/2017 | Adjakple | H04W 64/00 |
| 2017/0311290 A1* | 10/2017 | Adjakple | H04W 72/04 |
| 2017/0325281 A1* | 11/2017 | Hong | H04W 76/046 |
| 2017/0325282 A1* | 11/2017 | Hong | H04W 36/04 |
| 2017/0325283 A1* | 11/2017 | Wu | H04W 52/0216 |
| 2018/0020382 A1* | 1/2018 | Kim | H04W 36/0055 |

OTHER PUBLICATIONS

Search Report dated Sep. 20, 2017 for EP application No. 17169894.7, p. 1-12.
Nokia, Alcatel-Lucent Shanghai Bell, "Considerations on light connection", 3GPP TSG-RAN WG2 Meeting #93bis, R2-162612, Apr. 11-15, 2016, Dubrovnik, Croatia, XP051082180, pp. 1-3.
Intel Corporation, "Further enhancements on signalling reduction to enable light connection for LTE", 3GPP TSG RAN Meeting #71, RP-160425, Mar. 7-10, 2016, Gothenburg, Sweden, XP051076366, pp. 1-7.
Huawei, China Telecom, HiSilicon, "General aspects for light connection", 3GPP TSG RAN WG2 Meeting #93bis, R2-162278, Apr. 11-15, 2016, Dubrovnik, Croatia, XP051082038, pp. 1-3.
Huawei, China Telecom, HiSilicon, "General principles and paging optimization in light connection", 3GPP TSG RAN WG2 Meeting #93bis, R2-162520, Apr. 11-15, 2016, Dubrovnik, Croatia, XP051082150, pp. 1-4.
ETSI TS 136 331 V13.1.0 (Apr. 2016), "LTE; Evolved Universal Terrestrial Radio Access (E-UTRA); Radio Resource Control (RRC); Protocol specification (3GPP TS 36.331 version 13.1.0 Release 13)", XP014274631, pp. 1-729.
ETSI TS 136 304 V13.1.0 (Apr. 2016), "LTE; Evolved Universal Terrestrial Radio Access (E-UTRA); User Equipment (UE) procedures in idle mode (3GPP TS 36.304 version 13.1.0 Release 13)", XP014274615, pp. 1-45.
CATT, "Discussion on paging in light connection", 3GPP TSG RAN WG2 Meeting #93bis, R2-162514, Apr. 11-15, 2016, Dubrovnik, Croatia, XP051082144, pp. 1-2.

* cited by examiner

DEVICE AND METHOD OF HANDLING A RADIO RESOURCE CONTROL STATE CHANGE

CROSS REFERENCE TO RELATED APPLICATIONS

This application claims the benefit of U.S. Provisional Application No. 62/333,281 filed on May 9, 2016, which is incorporated herein by reference.

BACKGROUND OF THE INVENTION

1. Field of the Invention

The present invention relates to a device and a method used in a wireless communication system, and more particularly, to a device and a method of handling a radio resource control state change.

2. Description of the Prior Art

The 3rd Generation Partnership Project (3GPP) is discussing a new radio resource control (RRC) state, i.e., RRC_Light_Connected for a long-term evolution (LTE) system to improve system performance. It allows a UE in the RRC_Light_Connected to determine by itself whether to perform the cell reselection or not. The UE in the RRC_Light_Connected keeps configurations received in a RRC_Connected state. Since the configurations can be reused, the UE in the RRC_Light_Connected can transfer back to the RRC_Connected faster than a UE in a RRC_Idle state. The RRC_Light_Connected state can be seen as a state between a RRC_Connected state and a RRC_Idle state. However, what action the UE does upon the transition to the RRC_Light_Connected is still unknown.

SUMMARY OF THE INVENTION

The present invention therefore provides a communication device for handling a radio resource control connection state change to solve the abovementioned problem.

A communication device for handling a radio resource control (RRC) state change comprises a storage unit for storing instructions and a processing circuit coupled to the storage unit. The processing circuit is configured to execute the instructions stored in the storage unit. The instructions comprise receiving a RRC Connection Setup message for establishing a RRC connection between the communication device and a first base station (BS), in a first cell from the first BS; entering a RRC_Connected state in response to the RRC Connection Setup message and stopping performing a cell selection; receiving a Security Mode Command message via the RRC connection, in the first cell from the first BS, to activate a security for a data communication between the communication device and the first BS; receiving a RRC Connection Reconfiguration message configuring at least one radio bearer (RB) in the first cell via the RRC connection from the first BS, after activating the security; transmitting a user equipment (UE) capability indicating that the communication device supports a RRC_Light_Connected state, in the first cell to the first BS; receiving a RRC message configuring the RRC_Light_Connected state to the communication device, in the first cell from the first BS, after transmitting the UE capability; and entering the RRC_Light_Connected state in response to the RRC message and starting performing a cell reselection.

A network for handling a radio resource control (RRC) state change comprises a storage unit for storing instructions and a processing circuit coupled to the storage unit. The processing circuit is configured to execute the instructions stored in the storage unit. The instructions comprise transmitting a RRC Connection Setup message to a communication device to establish a RRC connection between the communication device and a first base station (BS); transmitting a Security Mode Command message via the RRC connection to the communication device, to activate a security for a data communication between the communication device and the first BS; transmitting a RRC Connection Reconfiguration message configuring at least one radio bearer (RB) from the first BS, after activating the security; receiving a user equipment (UE) capability indicating that the communication device supports a RRC_Light_Connected state, from the communication device; transmitting a first RRC message configuring the RRC_Light_Connected state to the communication device, after receiving the UE capability from the communication device, and when determining no data in a first BS buffer needs to be transmitted to the communication device and there is no data in a buffer of the communication device to be transmitted; receiving a RRC Connection Resume Request message from the communication device, after transmitting the first RRC message; and transmitting a second RRC message configuring the communication device to enter a RRC_Connected state to the communication device in response to the RRC Connection Resume Request message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
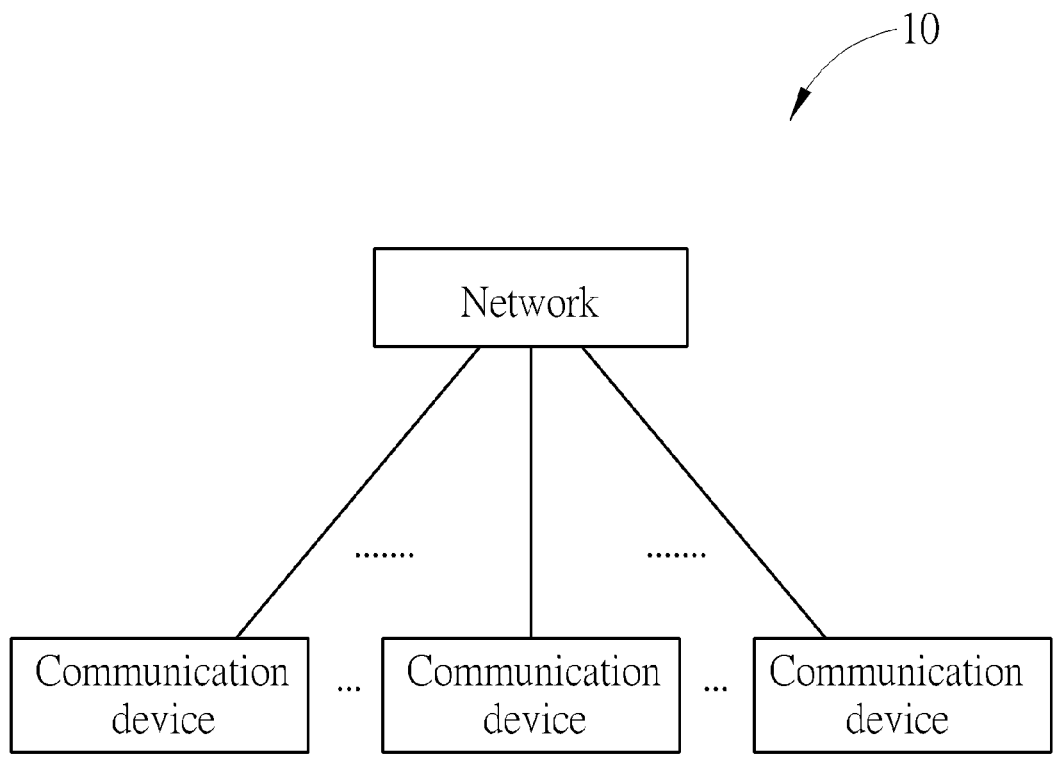
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s).

In FIG. 1, the network and the communication devices are simply utilized for illustrating the structure of the wireless communication system 10. The network may be a narrow-band (NB) internet of things (IoT) network or an evolved universal terrestrial radio access network (E-UTRAN) including at least one evolved Node-B (eNB). The network may be a fifth generation (5G) network including at least one 5G base station (BS) which employs orthogonal frequency-division multiplexing (OFDM) and/or non-OFDM (e.g., filtered OFDM (F-OFDM), Generalized Frequency Division Multiplexing (GFDM), Universal Filtered Multi-Carrier (UFMC) or Filter Back Multi-Carrier (FBMC)), and a transmission time interval (TTI) shorter than 1 ms (e.g. 100 or 200 microseconds). In general, a BS may also be used to refer any of the eNB and the 5G BS.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
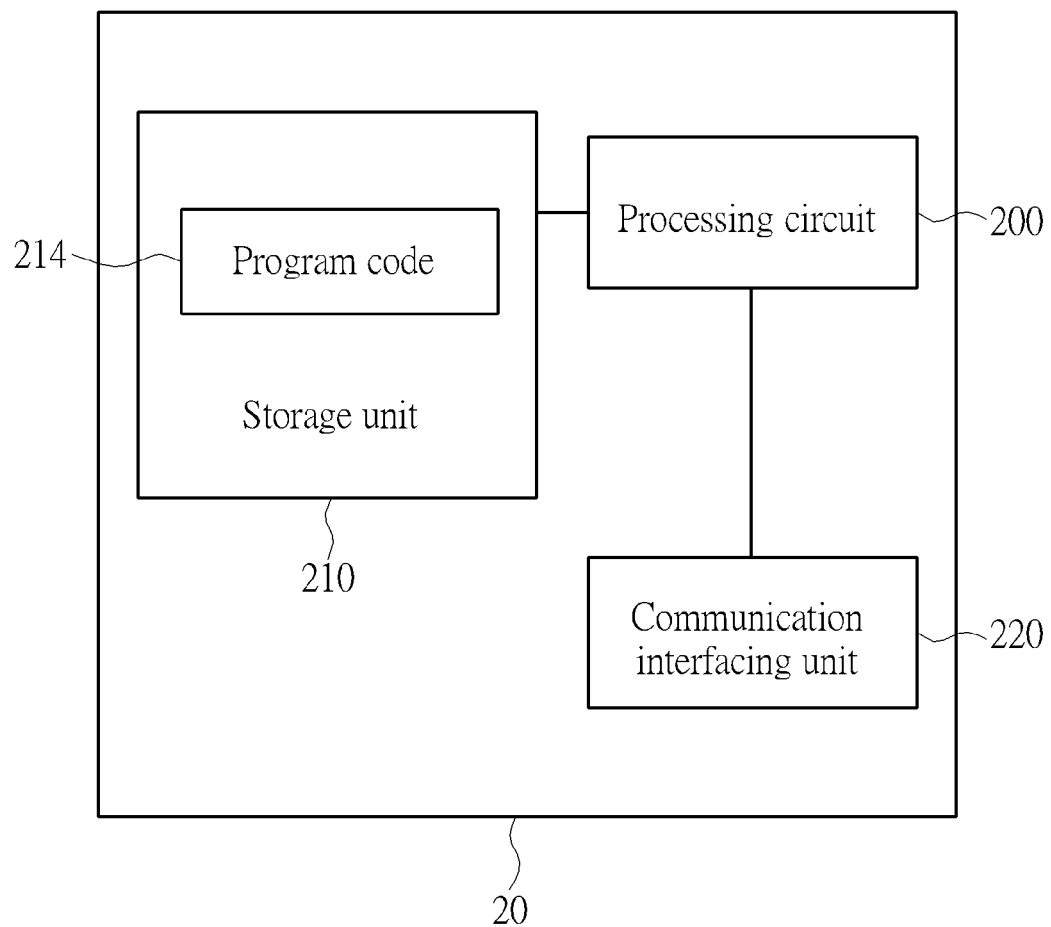
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is transceiver(s) used for transmitting and receiving signals (e.g., data, messages and/or packets) according to processing results of the processing circuit 200.

In the following examples, a UE is used for representing a communication device in FIG. 1, to simplify the illustration of the embodiments.

Figure 3:
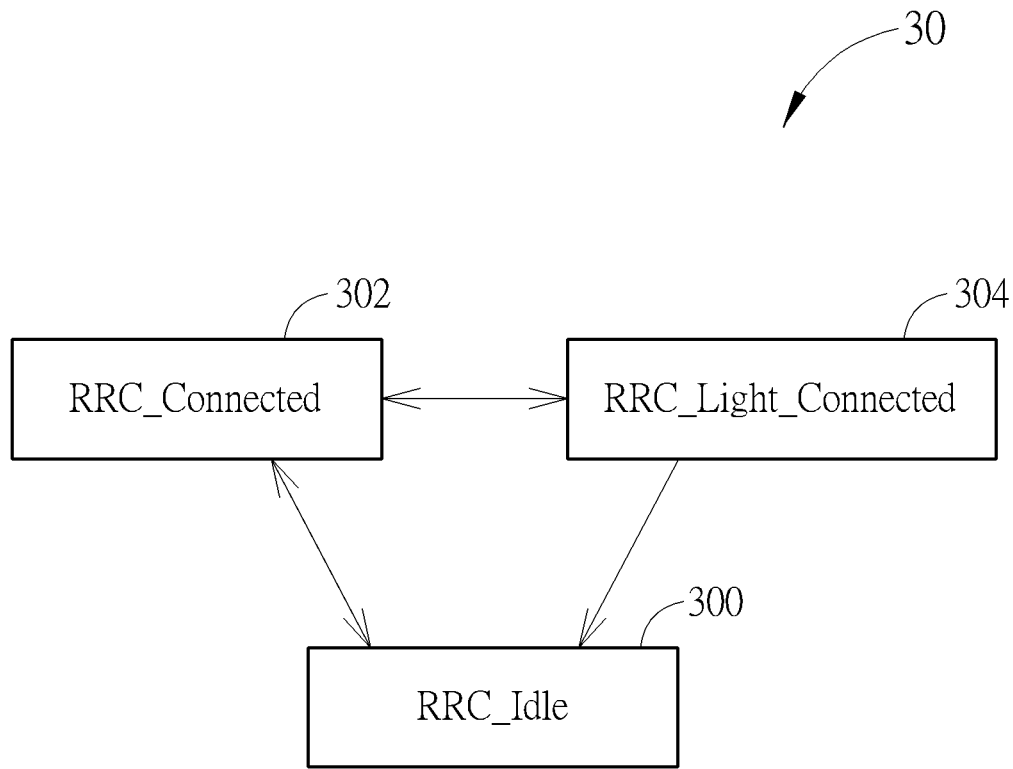
FIG. 3 is a schematic diagram of RRC states/modes in mobility enhancement according to an example of the present invention.

FIG. 3 is a schematic diagram 30 of RRC states/modes in mobility enhancement according to an example of the present invention. There are three states: a RRC_Idle 300, a RRC_Connected 302 and a RRC_Light_Connected 304. The UE is configured to be in one of the three states. The UE moves to the RRC_Connected 302 from the RRC_Idle 300, when the UE establishes a RRC connection with a BS. After that, when the BS detects that there is no data activity, the BS may transmit a RRC message, to make the UE move to the RRC_Light_Connected 304.

Figure 4:
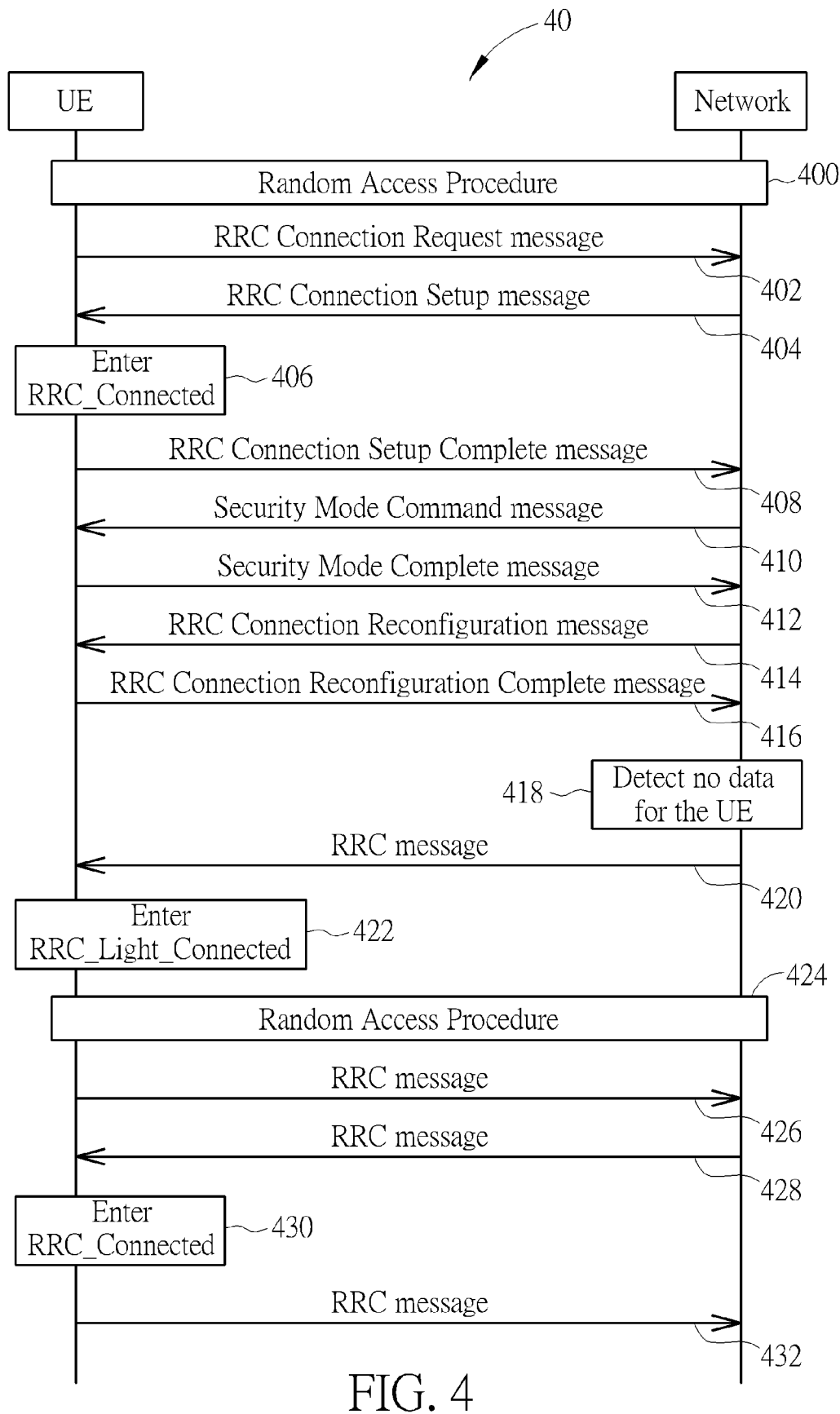
FIG. 4 is a sequence chart of a RRC state change procedure according to an example of the present invention.

FIG. 4 is a sequence chart of a RRC state change procedure 40 according to an example of the present invention. A UE performs a random access procedure 400 to a network (e.g., E-UTRAN or 5G RAN) to transmit a RRC Connection Request message 402 to the network. The UE enters a RRC_Connected (Step 406), when receiving a RRC Connection Setup message 404 from the network. The UE stops performing cell selection and reselection when entering the RRC_Connected, and transmits a RRC Connection Setup Complete message 408 to the network. Next, the network transmits a Security Mode Command message 410 to the UE to activate security for data communication between the UE and the network. The UE transmits a Security Mode Complete message 412 to the network in response to the Security Mode Command message 410. The network transmits a RRC Connection Reconfiguration message 414 to the UE for security activation and a radio bearer (RB) establishment. The UE transmits a RRC Connection Reconfiguration Complete message 416 to the network in response to the RRC Connection Reconfiguration message 414. A signaling RB 2 (SRB2) and/or a data RB (DRB) may be established between the UE and the network according to the RRC Connection Reconfiguration message. When the network detects that there is no data for the UE (Step 418), the network transmits a RRC message 420 configuring a RRC_Light_Connected to the UE. Then, the UE enters the RRC_Light_Connected (Step 422) in response to the RRC message 420. The UE in the RRC_Light_Connected starts performing a cell selection or reselection according to measurement results. If the UE in the RRC_Light_Connected needs to transmit data, the UE performs a random access procedure 424 to the network to transmit a RRC message 426. The UE enters the RRC_Connected (Step 430), when receiving a RRC message 428 from the network. The UE stops performing the cell selection or reselection, and transmits a RRC complete message 432 to the network.

If the RRC message 420 is a RRC Connection Release message or a newly defined RRC message, the UE transmits an acknowledgement (e.g. Hybrid Automatic Repeat Request (HARQ), Radio Link Control (RLC) or Packet Data Convergence Protocol (PDCP) acknowledgement) for acknowledging reception of the RRC message 420 to the network, before entering the RRC_Light_Connected. If the RRC message 420 is a RRC Connection Reconfiguration message, the UE transmits a RRC Connection Reconfiguration Complete message to the network, before entering the RRC_Light_Connected.

In one example, if the UE fails transmitting the acknowledgement or the RRC Connection Reconfiguration Complete message, the UE transmits a RRC Connection Reestablishment Request message to the network and ignores the configuration of the RRC_Light_Connected.

Figure 5:
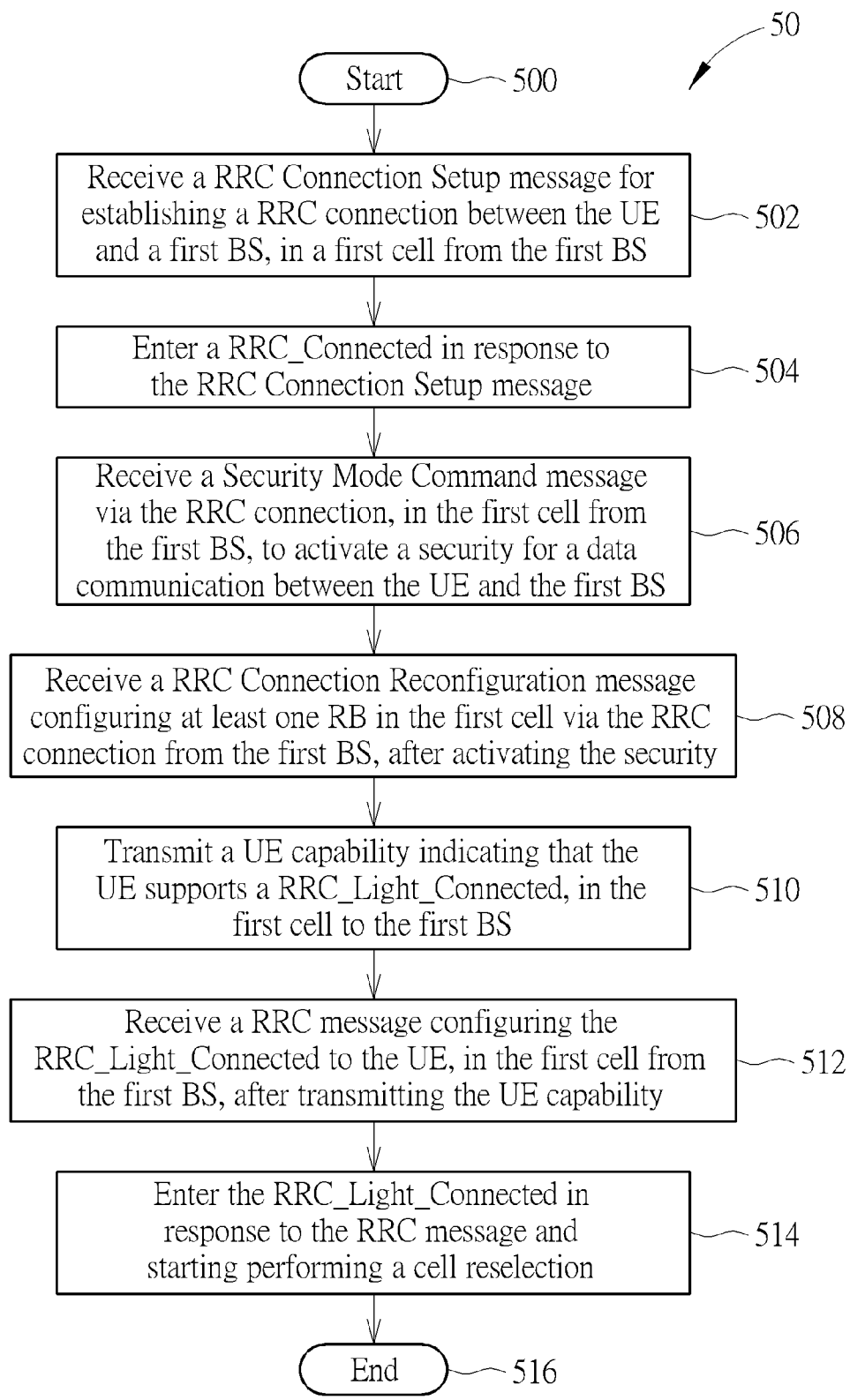
FIG. 5 is a flowchart of a process according to an example of the present invention.

FIG. 5 is a flowchart of a process 50 according to an example of the present invention. The process 50 is utilized in the UE shown in FIG. 1, for handling a RRC state change. The process 50 includes the following steps:

Step 500: Start.

Step 502: Receive a RRC Connection Setup message for establishing a RRC connection between the UE and a first BS, in a first cell from the first BS.

Step 504: Enter a RRC_Connected in response to the RRC Connection Setup message.

Step 506: Receive a Security Mode Command message via the RRC connection, in the first cell from the first BS, to activate a security for a data communication between the UE and the first BS.

Step 508: Receive a RRC Connection Reconfiguration message configuring at least one RB in the first cell via the RRC connection from the first BS, after activating the security.

Step 510: Transmit a UE capability indicating that the UE supports a RRC_Light_Connected, in the first cell to the first BS.

Step 512: Receive a RRC message configuring the RRC_Light_Connected to the UE, in the first cell from the first BS, after transmitting the UE capability.

Step 514: Enter the RRC_Light_Connected in response to the RRC message and starting performing a cell reselection.

Step 516: End.

According to the process 50, the UE receives a RRC Connection Setup message for establishing a RRC connection between the UE and the first BS, in a first cell from the first BS. Then the UE enters a RRC_Connected in response to the RRC Connection Setup message. The UE receives a Security Mode Command message via the RRC connection, in the first cell from the first BS, to activate a security for a data communication between the UE and the first BS. After activating the security, the UE receives a RRC Connection Reconfiguration message configuring at least one RB in the first cell via the RRC connection (e.g., via SRB1) from the first BS. The UE transmits a UE capability indicating that the UE supports a RRC_Light_Connected, in the first cell to the first BS. After transmitting the UE capability, the UE receives a RRC message configuring the RRC_Light_Connected to the UE, in the first cell from the first BS. The UE enters the RRC_Light_Connected in response to the RRC message and starting performing a cell reselection. In other words, the UE informs the first BS that the UE supports the RRC_Light_Connected by transmitting the UE capability. Thus, the first BS can configure the UE to enter the RRC_Light_Connected.

Realization of the process 50 is not limited to the above description. The following examples may be applied to the process 50.

In one example, in response to the RRC message, the UE releases at least one physical layer resource configuration, and keeps at least one non-physical layer resource configuration. The UE receives the at least one physical layer resource configuration and the at least one non-physical layer resource configuration from the first BS, when the UE is in the RRC_Connected. For example, the at least one physical layer resource configuration includes PhysicalConfigDedicated. For example, the at least one non-physical layer resource configuration may include at least one of a measurement configuration, a discontinuous reception (DRX) configuration, srb-ToAddModList, a drb-ToAddModList and drb-ToAddModListSCG-r12.

In one example, the UE in the RRC_Light_Connected releases at least one of a Secondary Cell Group (SCG) configuration (e.g., MAC-MainConfig for SCG), a semi-persistent scheduling (SPS) configuration, a SCell configuration, a long-term-evolution-wireless-local-area-network (LTE-WLAN) aggregation (LWA) configuration (e.g., LWA-Config), a LTE-WLAN Radio Level Integration with Internet Protocol Security (IPSec) Tunnel (LWIP) configuration (e.g., LWIP-Config). The UE in the RRC_Light_Connected keeps at least one of a Radio Access Network (RAN) Controlled LTE-WLAN Integration (RCLWI) configuration (e.g., RCLWI-Config) and a WLAN Offload configuration (e.g., wlan-OffloadInfo). The UE receives the above configuration(s), when the UE is in the RRC_Connected.

In one example, the UE in the RRC_Light_Connected keeps (i.e., maintains, not releases) a measurement configuration, and stops a measurement reporting configured by the measurement configuration (i.e., not transmit any measurement report). The measurement configuration includes a measurement identity, a measurement object and a reporting configuration. The UE in the RRC_Connected receives the measurement configuration. In one example of stopping the measurement reporting, the UE may not check whether a measurement event occurs (i.e., the measurement event never occurs). Thus, no event occurs to trigger the measurement reporting. In one example of stopping the measurement reporting, the UE stops a periodic timer controlling periodic measurement reporting. Thus, no expiry of the periodic timer occurs to trigger the measurement reporting. In one example of stopping the measurement reporting, the UE checks whether the measurement event occurs and/or let the periodic timer run and expire. When the event occurs and/or the periodic timer expires, the UE stops transmitting a measurement report. The UE in the RRC_Light_Connected still keeps the measurement configuration, when the UE changes to a second cell from the first cell due to the cell selection or reselection.

In one example, the UE in the RRC_Connected receives a first measurement configuration for a first carrier and a second measurement configuration for a second carrier, from the first BS on the first carrier. When the UE receives the RRC message configuring the RRC_Light_Connected, from the first BS on the first carrier, the UE releases the second measurement configuration but keeps the first measurement configuration. The UE may stop a measurement reporting configured by the first measurement configuration according to the previous examples. When the UE transfers back to the RRC_Connected, the UE starts the measurement reporting configured by the first measurement configuration.

In one example, the UE in the RRC_Connected receives a first measurement configuration for a first carrier and a second measurement configuration for a second carrier, from the first BS on the first carrier. When the UE receives the RRC message configuring the RRC_Light_Connected, from the first BS on the first carrier, the UE keeps the first measurement configuration and the second measurement configuration. When the UE transfers back to the RRC_Connected, the UE starts a measurement reporting configured by the first measurement configuration and the second measurement configuration. When the UE in the RRC_Light_Connected determines by itself to reselect to a cell on the second carrier according to a cell reselection criteria, the UE replaces a second measurement object in the second measurement configuration with a first measurement object in the first measurement configuration. Further, the UE replaces a first measurement object in the first measurement configuration with a second measurement object in the second measurement configuration. The UE may perform the replacement, when the UE enters the RRC_Connected on the second carrier.

It should be noted that the UE in the RRC_Light_Connected may still perform a measurement on a carrier indicated in a measurement object in a kept measurement configuration for a cell reselection. The UE in the RRC_Light_Connected state measures a cell specific reference signal (CRS) on a carrier frequency. If the measurement object includes a measDS-Config, the UE in the RRC_Light_Connected state may or may not measure a discovery signal configured in the measDS-Config. When the UE transfers back from the RRC_Light_Connected to the RRC_Connected, the UE starts the measurement reporting according to the reporting configuration in the kept measurement configuration.

In one example, the UE in the RRC_Light_Connected keeps (i.e., maintains, not releases) a first DRX configuration but may not use the first DRX configuration. Instead, the UE uses a second DRX configuration. The UE in the RRC_Light_Connected still keeps the first DRX configuration, when the UE changes to a second cell from the first cell due to a cell selection or reselection. When the UE transfers back from the RRC_Light_Connected state to the RRC_Connected state, the UE uses the first DRX configuration instead of the second DRX configuration. Practically, the second DRX cycle may be the same as or longer than the first DRX cycle. The second DRX has a short on-duration than the first DRX, in order to save power consumption of the UE.

In one example, the UE in the RRC_Light_Connected releases a scheduling request (SR) configuration (e.g., SchedulingRequestConfig). The UE in the RRC_Light_Connected releases the SR configuration, when the UE changes to a second cell from the first cell due to a cell selection or reselection. The UE in the RRC_Light_Connected releases the SR configuration whether the UE changes a cell or not.

In the above examples, the second cell belongs to the first BS or a second BS. The UE receives the measurement configuration, the first DRX configuration, the second DRX configuration and the SR configuration from the first BS (e.g., in a RRC Connection Reconfiguration message), when the UE is in the RRC_Connected before entering the RRC_Light_Connected. The UE receives the second DRX configuration in system information broadcasted by the first BS or the second BS.

Further, the UE transmits a RRC message (i.e., first RRC message) to the first BS or the second BS, when the UE needs to transmit data (e.g., internet protocol (IP) data, short message or non-access-stratum message) or when the UE receives a paging message from the first BS or the second BS. The RRC message may request the first BS or the second BS to configure the UE to the RRC_Connected. When the BS (e.g., the first BS or the second BS) receives the RRC message, the BS may transmit a RRC response message (i.e., second RRC message) configuring the UE to enter the RRC_Connected, to the UE. When the UE receives the RRC response message, the UE may enter the RRC_Connected and may start transmitting the data and/or receiving the data (e.g. IP data, short message or non-access-stratum message). In one example, the RRC response message may include a SR configuration. Thus, the UE can transmit a SR according to the SR configuration. The RRC response message may not include MobilityControlInfo for a handover. That is, the first BS or the second BS may not hand over the UE upon receiving the RRC message. The RRC message may include an identity of the UE for the first BS or the second BS to identify the UE. The RRC response message may include a security configuration to activate security for a data communication between the UE and the first BS or the second BS. The security configuration may include at least one of a count value (e.g., nextHopChainingCount) and a key change indicator (i.e., keyChangeIndicator). The UE and the first BS or the second BS may derive at least one key from the at least one of the count value and the key change indicator for an encryption of the data and a decryption of the encrypted data, and/or an integrity protection check of the data.

The UE may transmit an Extended Service Request message via the RRC connection to a core network (e.g., MME) in response to the paging message after entering the RRC_Connected from the RRC_Light_Connected state, if the paging message indicates a circuit switched (CS) paging. The UE may or may not transmit a Service Request message to the core network in response to the paging message after entering the RRC_Connected from the RRC_Light_Connected state, if the paging message indicates a packet switched (PS) paging.

In one example, when the UE enters the RRC_Connected from the RRC_Light_Connected, the UE transmits a UL PDCP Protocol Data Unit (PDU) of a PDCP entity associated to a RB (SRB or DRB) to the first BS or the second BS. The UE may set one or both of TX_HFN and Next_PDCP_TX_SN of the PDCP entity to an initial value (i.e., 0) for transmitting the UL PDCP PDU. When the UE enters the RRC_Connected from the RRC_Light_Connected, the UE receives a DL PDCP PDU of a PDCP entity associated to a RB from the first BS or the second BS. Correspondingly, the first BS or the second BS may also set one or both of RX_HFN and Next_PDCP_RX_SN of the PDCP entity to an initial value (i.e., 0) for receiving the UL PDCP PDU from the UE. The UE may set one or both of RX_HFN and Next_PDCP_RX_SN of the PDCP entity to an initial value (i.e., 0) for receiving the DL PDCP PDU. Correspondingly, the first BS or the second BS may also set one or both of TX_HFN and Next_PDCP_TX_SN of the PDCP entity to an initial value (i.e., 0) for transmitting the DL PDCP PDU to the UE. In one example, the UE and the first BS or the second BS may use TX_HFN, Next_PDCP_TX_SN, RX_HFN and Next_PDCP_RX_SN of the PDCP entity before entering the RRC_Light_Connected, instead of setting them to the initial value. In one example, the UE and the first BS or the second BS may set TX_HFN and RX_HFN to the initial value and may use Next_PDCP_TX_SN and Next_PDCP_RX_SN, before entering the RRC_Light_Connected. It should be noted that the setting action above may be done in response to receiving the RRC message or the RRC response message from the first BS or the second BS.

Figure 6:
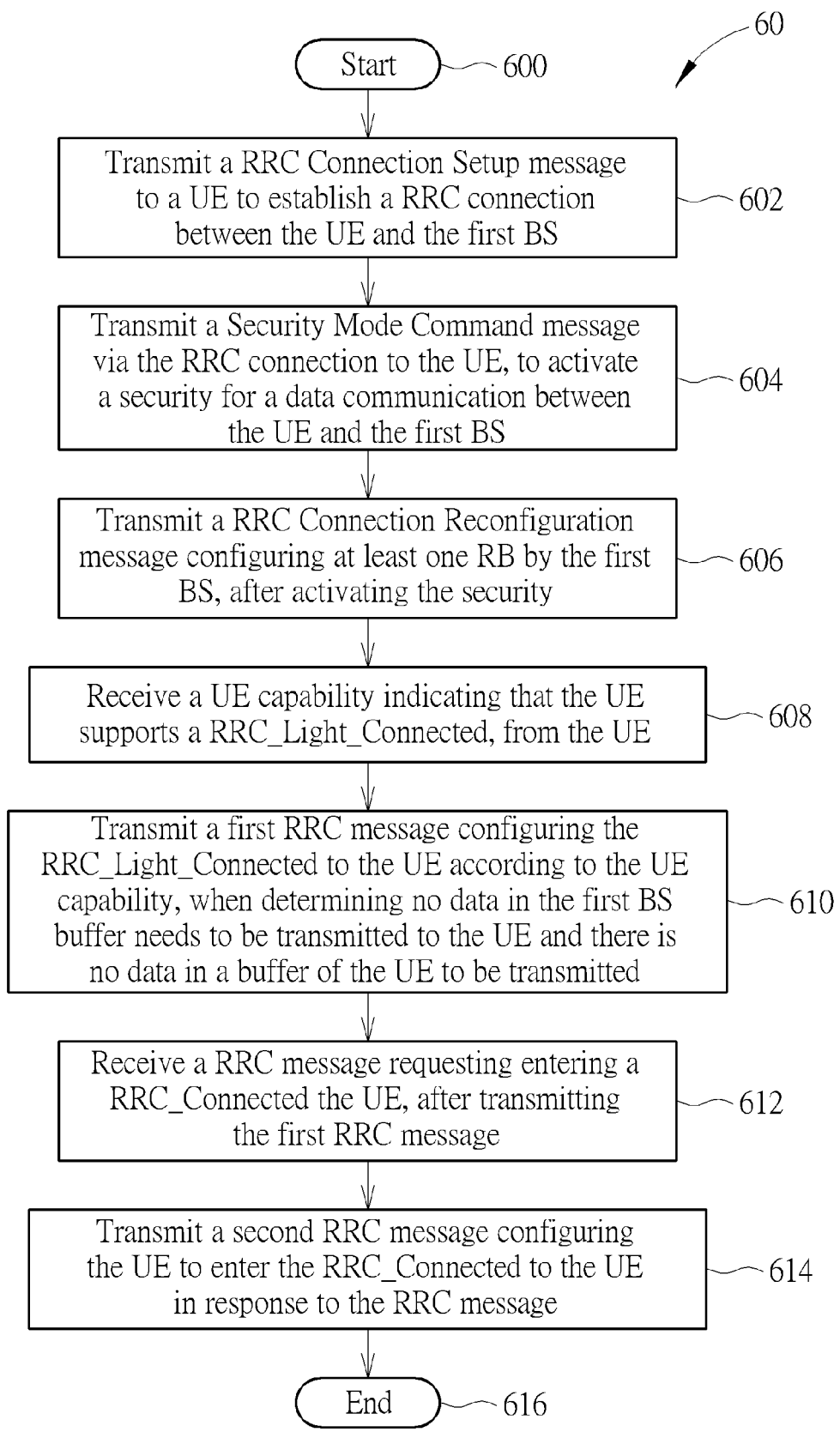
FIG. 6 is a flowchart of a process according to an example of the present invention.

FIG. 6 is a flowchart of a process 60 according to an example of the present invention. The process 60 is utilized in the network including a first BS and a second BS, shown in FIG. 1, for handling a RRC state change. The process 60 includes the following steps:

Step 600: Start.

Step 602: Transmit a RRC Connection Setup message to a UE to establish a RRC connection between the UE and the first BS.

Step 604: Transmit a Security Mode Command message via the RRC connection to the UE, to activate a security for a data communication between the UE and the first BS.

Step 606: Transmit a RRC Connection Reconfiguration message configuring at least one RB by the first BS, after activating the security.

Step 608: Receive a UE capability indicating that the UE supports a RRC_Light_Connected, from the UE.

Step 610: Transmit a first RRC message configuring the RRC_Light_Connected to the UE according to the UE capability, when determining no data in the first BS buffer needs to be transmitted to the UE and there is no data in a buffer of the UE to be transmitted.

Step 612: Receive a RRC message requesting entering a RRC_Connected the UE, after transmitting the first RRC message.

Step 614: Transmit a second RRC message configuring the UE to enter the RRC_Connected to the UE in response to the RRC message.

Step 616: End.

According to the process 60, the network (e.g., the first BS) transmits a RRC Connection Setup message to a UE to establish a RRC connection between the UE and the first BS. Then, the network transmits a Security Mode Command message via the RRC connection (e.g., SRB) to the UE, to activate a security for a data communication between the UE and the network. After activating the security, the network transmits a RRC Connection Reconfiguration message configuring at least one RB by the first BS. The network receives a UE capability indicating that the UE supports a RRC_Light_Connected, from the UE. The UE capability may be included in a RRC UECapabilityInformation message transmitted by the UE. The network transmits a first RRC message configuring the RRC_Light_Connected to the UE according to the UE capability and when determining no data in a first BS buffer needs to be transmitted to the UE and there is no data in a buffer of the UE to be transmitted. In one case, the first BS receives a RRC message requesting entering the RRC_Connected from the UE, after transmitting the first RRC message. The first BS transmits a second RRC message configuring the UE to enter the RRC_Connected to the UE in response to the RRC message. In another case, the second BS receives a RRC message requesting entering the RRC_Connected from the UE, after the first BS transmits the first RRC message. The second BS transmits a second RRC message configuring the UE to enter the RRC_Connected state to the UE in response to the RRC message.

Realization of the process 60 is not limited to the above description. The following examples may be applied to the process 60.

In one example, the first BS transmits the first RRC message to the UE, when the first BS knows that the UE supports the RRC_Light_Connected and no data in the first BS buffer needs to be transmitted to the UE. Without the UE capability, the first BS may not know the support of the RRC_Light_Connected and may configure the RRC_Idle to the UE.

In one example, the second RRC message configures a DRB which was a SCG or a split bearer configured to the UE before the UE enters the RRC_Light_Connected, to a master cell group (MCG) bearer. The UE configures the DRB to be the MCG bearer in response to the second RRC message. Thus, the UE starts transmitting data of the DRB upon entering the RRC_Connected.

In one example, the first BS and/or the second BS indicates support of the RRC_Light_Connected in a message (e.g., a broadcast message such as system information block (SIB), a dedicated RRC message such as a RRC Connection Setup message or a RRC Connection Reconfiguration message) to the UE. The UE determines transmitting the RRC message to the first BS in Step 612, if the message indicates that the first BS supports the RRC_Light_Connected. Further, if the UE in the RRC_Light_Connected reselects to a cell of a third BS and learns that the third BS does not support the RRC_Light_Connected from the message, the UE may release the kept configurations described above and may go to a RRC_Idle. Then, the UE transmits a RRC Connection Request message to the third BS for data communication. In one example, the RRC message requesting entering the RRC_Connected may be a RRC Connection Resume Request message.

Examples of the process 50 may be applied to the process 60 and vice versa. Activating a security may include that the UE generates an encryption key for encryption and decryption of data (e.g., SRB and DRB, if configured), and/or an integrity protection key for data (e.g., SRB).

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. For example, the RRC_Light_Connected may be introduced to the 5G system and the abovementioned description and examples can be applied to the 5G system. An example of the means may be the communication device 20. Any of the above processes and examples above may be compiled into the program code 214.

To sum up, the present invention provides a device and a method for handling a RRC state change. The communication system can apply the newly introduced RRC state according to the above examples. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a Radio Resource Control (RRC) state change, comprising:
a storage device; and
a processing circuit, coupled to the storage device, wherein the storage device stores, and the processing circuit is configured to execute instructions of:
receiving a RRC Connection Setup message for establishing a RRC connection between the communication device and a first base station (BS), in a first cell from the first BS;
entering a RRC_Connected state in response to the RRC Connection Setup message;
receiving a Security Mode Command message via the RRC connection, in the first cell from the first BS, to activate a security for a data communication between the communication device and the first BS;
receiving a RRC Connection Reconfiguration message configuring at least one radio bearer (RB) in the first cell via the RRC connection from the first BS, after activating the security;
transmitting a user equipment (UE) capability indicating that the communication device supports a RRC_Light_Connected state, in the first cell to the first BS;
receiving a RRC message configuring the RRC_Light_Connected state to the communication device, in the first cell from the first BS;
entering the RRC_Light_Connected state in response to the RRC message and starting performing a cell reselection;
keeping a first discontinuous reception (DRX) configuration and not using the first DRX configuration; and
using a second DRX configuration.

2. The communication device of claim 1, wherein the instruction of entering the RRC_Light_Connected state comprises:
releasing at least one physical layer resource configuration; and
keeping at least one non-physical layer resource configuration.

3. The communication device of claim 1, wherein when the communication device is in the RRC_Light_Connected state, and the instructions further comprise:
releasing at least one of a Secondary Cell Group (SCG) configuration, a semi-persistent scheduling (SPS) configuration, a Secondary Cell (SCell) configuration, a long-term-evolution-wireless-local-area-network (LTE-WLAN) aggregation (LWA) configuration, and a LTE-WLAN Radio Level Integration with Internet Protocol Security (IPsec) Tunnel (LWIP) configuration; and
keeping at least one of a radio access network (RAN) Controlled LTE-WLAN Integration (RCLWI) configuration and a WLAN Offload configuration.

4. The communication device of claim 1, wherein the instructions further comprise:
receiving a first measurement configuration for a first carrier and a second measurement configuration for a second carrier, from the first B S on the first carrier;
releasing the second measurement configuration and keeping the first measurement configuration, when receiving the RRC message configuring the RRC_Light_Connected state, on the first carrier from the first BS; and stopping the measurement reporting configured by the first measurement configuration when the communication device is in the RRC_Light_Connected state.

5. The communication device of claim 1, wherein the instructions further comprise:

receiving a first measurement configuration for a first carrier and a second measurement configuration for a second carrier, from the first BS on the first carrier;

keeping the first measurement configuration and the second measurement configuration, when receiving the RRC message configuring the RRC_Light_Connected state; and starting the measurement reporting configured by the first measurement configuration and the second measurement configuration, when the communication device transfers back to the RRC_Connected state.

6. The communication device of claim 1, wherein the instructions further comprise:

receiving a first measurement configuration for a first carrier and a second measurement configuration for a second carrier, from the first BS on the first carrier; and replacing a second measurement object in the second measurement configuration with a first measurement object in the first measurement configuration and replacing the first measurement object in the first measurement configuration with the second measurement object in the second measurement configuration, if determining to reselect to a cell on the second carrier according to a cell reselection criteria when the communication device is in the RRC_Light_Connected state.

7. The communication device of claim 1, wherein when the communication device is in the RRC_Light_Connected state, the instructions further comprise:

releasing a scheduling request (SR) configuration, when changing to a second cell from the first cell.

8. The communication device of claim 1, wherein the instructions further comprise:

transmitting an Extended Service Request message via the RRC connection to a core network in response to a paging message after entering the RRC_Connected state from the RRC_Light_Connected state, if the paging message indicates a circuit switched (CS) paging.

9. The communication device of claim 1, wherein the instructions further comprise:

transmitting a user equipment (UE) capability indicating that the communication device supports the RRC_Light_Connected state, in the first cell to the first BS.

10. The communication device of claim 1, wherein the instructions further comprise:

transmitting a RRC message to the first BS or a second BS when the communication device needs to transmit a data; or receiving a paging message from the first BS or the second BS.

11. A network for handling a Radio Resource Control (RRC) state change, comprising:

a storage device; and a processing circuit, coupled to the storage device, wherein the storage device stores, and the processing circuit is configured to execute instructions of:

transmitting a RRC Connection Setup message to a communication device to establish a RRC connection between the communication device and a first base station (BS) of the network;

transmitting a Security Mode Command message via the RRC connection to the communication device, to activate a security for a data communication between the communication device and the first BS;

transmitting a RRC Connection Reconfiguration message configuring at least one radio bearer (RB) from the first BS, after activating the security;

receiving a user equipment (UE) capability indicating that the communication device supports a RRC_Light_Connected state, from the communication device;

transmitting a first RRC message configuring the RRC_Light_Connected state to the communication device according to the UE capability, when determining no data in a first BS buffer needs to be transmitted to the communication device and there is no data in a buffer of the communication device to be transmitted;

receiving a RRC message requesting entering a RRC_Connected state from the communication device, after transmitting the first RRC message; and transmitting a second RRC message configuring the communication device to enter the RRC_Connected state to the communication device in response to the RRC message.

12. The network of claim 11, wherein a second BS of the network receives the RRC message from the communication device, after the first BS transmits the first RRC message and the second BS transmits the second RRC message configuring the communication device to enter the RRC_Connected state to the communication device in response to the RRC message.

13. The network of claim 11, wherein the second RRC message configures a data radio bearer (DRB) to a master cell group (MCG) bearer, wherein the DRB is a secondary cell group (SCG) or a split bearer configured to the communication device before the communication device enters the RRC_Light_Connected state.

14. The network of claim 11, wherein the first BS and/or a second BS indicate a support of the RRC_Light_Connected state in a message transmitted to the communication device.

15. A communication device for handling a Radio Resource Control (RRC) state change, comprising:

a storage device; and a processing circuit, coupled to the storage device, wherein the storage device stores, and the processing circuit is configured to execute instructions of:

receiving a RRC Connection Setup message for establishing a RRC connection between the communication device and a first base station (BS), in a first cell from the first BS;

entering a RRC_Connected state in response to the RRC Connection Setup message;

receiving a Security Mode Command message via the RRC connection, in the first cell from the first BS, to activate a security for a data communication between the communication device and the first BS;

receiving a RRC Connection Reconfiguration message configuring at least one radio bearer (RB) in the first cell via the RRC connection from the first BS, after activating the security;

transmitting a user equipment (UE) capability indicating that the communication device supports a RRC_Light_Connected state, in the first cell to the first BS;

receiving a RRC message configuring the RRC_Light_Connected state to the communication device, in the first cell from the first BS;

entering the RRC_Light_Connected state in response to the RRC message and starting performing a cell reselection;

keeping a measurement configuration when the communication device is in the RRC_Light_Connected state;

stopping a measurement reporting configured by the measurement configuration when the communication device is in the RRC_Light_Connected state; and starting the measurement reporting configured by the measurement configuration, when the communication device transfers back to the RRC_Connected state.

16. The communication device of claim 15, wherein the instructions further comprise:

transmitting a user equipment (UE) capability indicating that the communication device supports the RRC_Light_Connected state, in the first cell to the first BS.

17. A network for handling a Radio Resource Control (RRC) state change, comprising:

a storage device; and a processing circuit, coupled to the storage device, wherein the storage device stores, and the processing circuit is configured to execute instructions of:

transmitting a RRC Connection Setup message to a communication device to establish a RRC connection between the communication device and a first base station (BS) of the network;

transmitting a Security Mode Command message via the RRC connection to the communication device, to activate a security for a data communication between the communication device and the first BS;

transmitting a RRC Connection Reconfiguration message configuring at least one radio bearer (RB) from the first BS, after activating the security;

transmitting a user equipment (UE) capability indicating that the communication device supports a RRC_Light_Connected state, in the first cell to the first BS;

transmitting a first RRC message configuring the RRC_Light_Connected state to the communication device, when determining no data in a first BS buffer needs to be transmitted to the communication device and there is no data in a buffer of the communication device to be transmitted;

receiving a RRC message requesting entering a RRC_Connected state from the communication device, after transmitting the first RRC message;

transmitting a second RRC message configuring the communication device to enter the RRC_Connected state to the communication device in response to the RRC message;

releasing at least one physical layer resource configuration; and keeping at least one non-physical layer resource configuration.

* * * * *